Nov. 10, 1936.   J. A. V. TURCK   2,060,703
CALCULATING MACHINE
Original Filed July 31, 1923   5 Sheets—Sheet 5

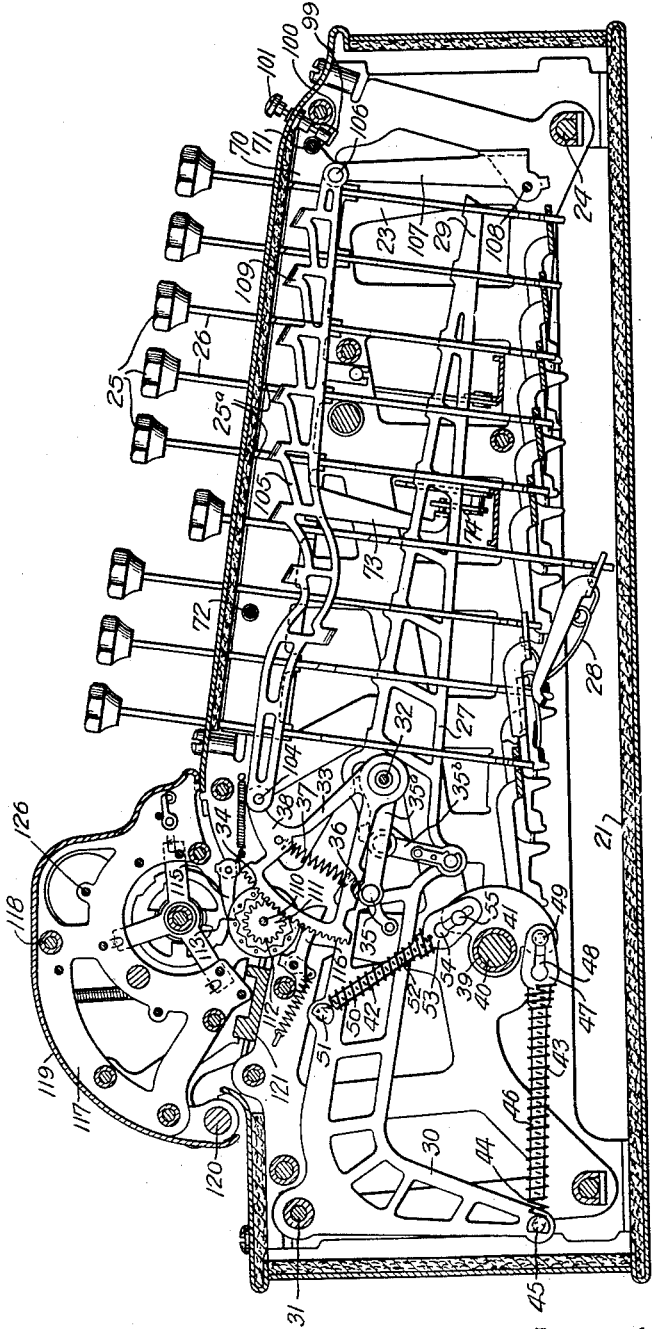

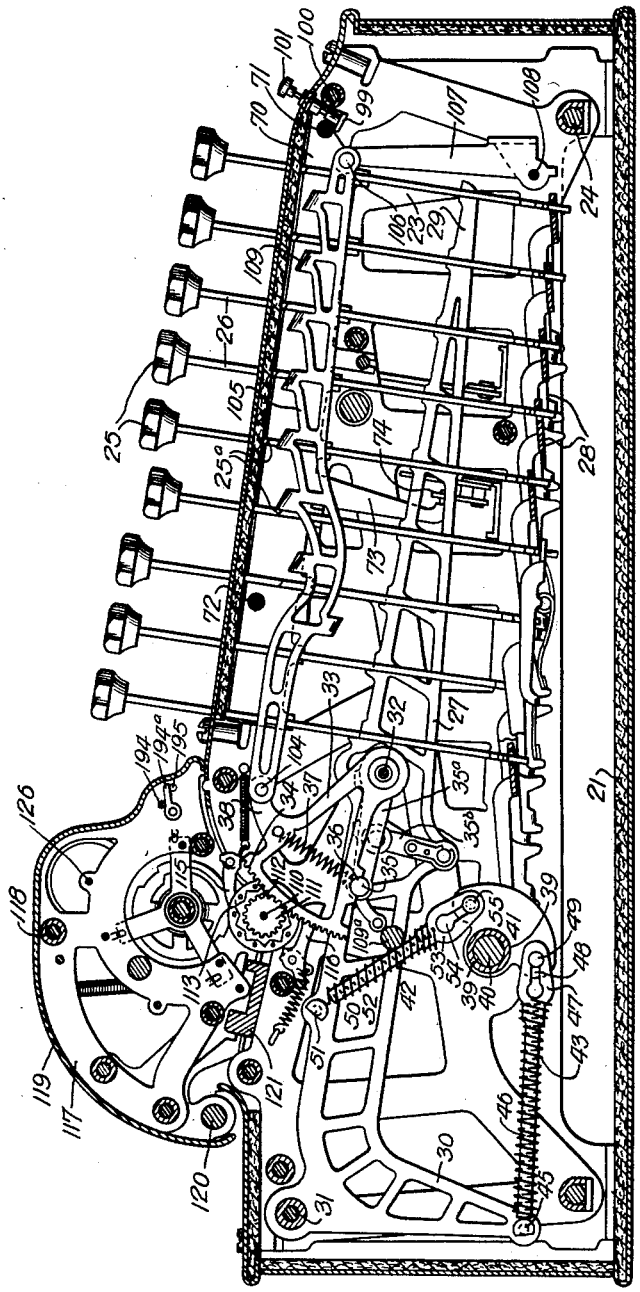

Inventor
JOSEPH A. V. TURCK.
By Henry Love Clarke
his Attorney

Patented Nov. 10, 1936

2,060,703

UNITED STATES PATENT OFFICE 2,060,703

CALCULATING MACHINE

Joseph A. V. Turck, Wilmette, Ill., assignor to Felt & Tarrant Manufacturing Company, Chicago, Ill., a corporation of Illinois Original application July 31, 1923, Serial No. 654,874. Divided and this application July 1, 1932, Serial No. 620,506

13 Claims. (Cl. 235—136)

The essential object of this invention is to provide a calculating machine that is alternatively operable by key-drive or by key-set power-drive, and including an accumulator mechanism alternatively stationary for key-driven actuation or either stationary or shiftable for key-set power-driven actuation. With the machine of the present invention, the operator has the choice of either a key-drive or a key-set power-drive when performing additive calculation, whether positively as in addition, or negatively by the complemental method as in subtraction. In performing multiple stroke calculation, whether positively as in multiplication or negatively as in division, the operator may employ the key-drive with or without shift of the accumulator mechanism, or the power-drive with shift of the accumulator mechanism for the accumulation of each order of the multiple stroke factor. More particularly the present application relates to the improvements in carrying mechanism disclosed in my copending application Ser. No. 654,874, filed July 31, 1923, now Patent No. 1,869,872 of which this application is a division.

Briefly stated, the machine of the present invention embodies in its construction, ordinal column actuating mechanism alternatively operable by ordinal key-drive or by key-set power drive; a manually controlled device for determining the character of drive of the column actuators; a power mechanism for driving the column actuators in key-set power-driven actuation; ordinal keys for driving the column actuators in key-driven actuation or for setting said actuators for power driven actuation, a carriage alternatively stationary for key-driven actuation or key-set power-driven actuation, or shiftable for key-set power-driven multiple-stroke actuation, said carriage supporting and shifting with it an ordinal accumulator mechanism, including means for effecting carrying of the tens, arranged to receive actuation from the column actuators in any ordinal position of the carriage, and also supporting a shiftable counter for registering the power actuation in each ordinal position of the carriage; and zeroizing mechanism for restoring to zero the various orders of the accumulator mechanism and of the counter.

The present invention embodies, among other important features, a new direct and indirect, or combined direct and indirect actuation of the numeral wheels of the registering mechanism.

In addition to the general objects recited above the invention has for further objects such other improvements or advantages in construction or operation as may be found to obtain in the structures and devices hereinafter described or claimed.

In the accompanying drawings, forming a part of this specification and showing, for purposes of exemplification, a preferred form and manner in which the invention may be embodied and practiced, but without limiting the claimed invention specifically to such illustrative instance or instances:—

Fig. 3 is a vertical section taken longitudinally of the machine and showing the operation of the actuating mechanism in key-driven actuation of the machine;

Fig. 4 is another view similar to Fig. 3, but showing the operation of the actuating mechanism in key-set power-driven actuation of the machine;

Figure 1:
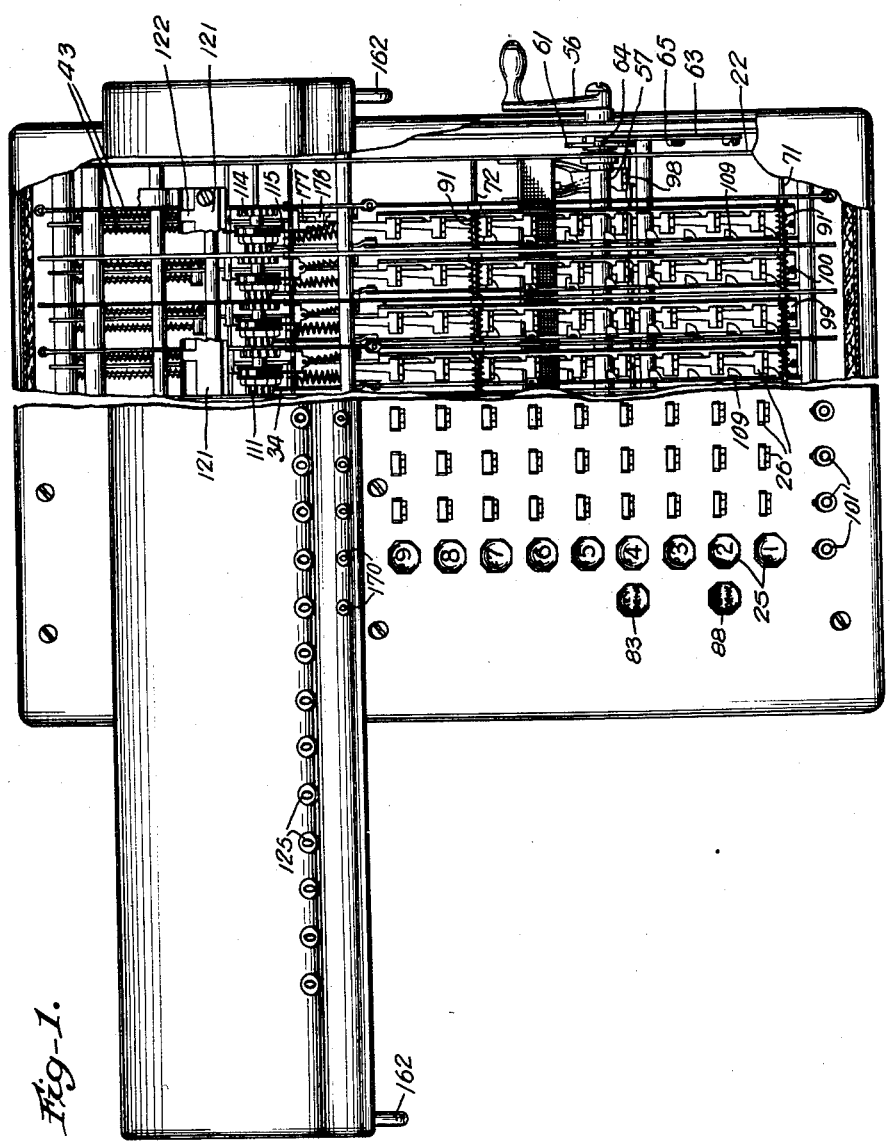
Fig. 1 is a top plan view of a calculating machine embodying the present invention, but with a part of the top casing plate and of the carriage and some of the keys broken away to show the interior construction.
Figure 2:
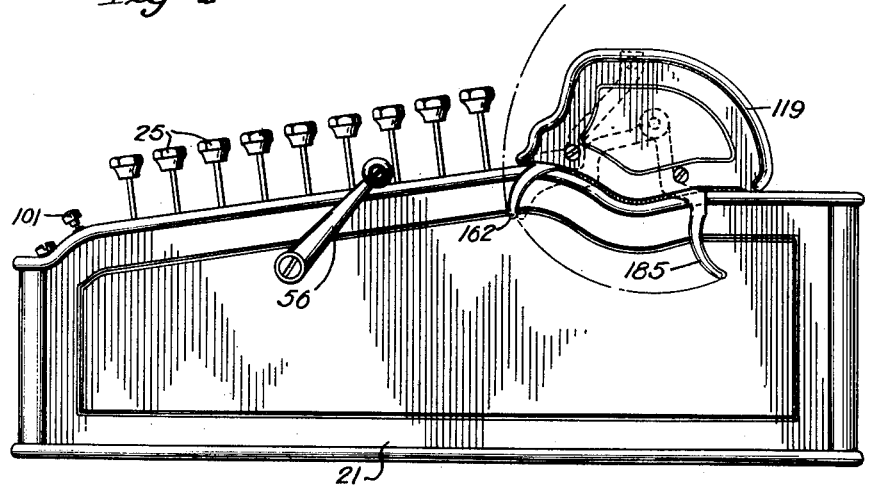
Fig. 2 is a right hand side elevation of the machine.
Figure 5:
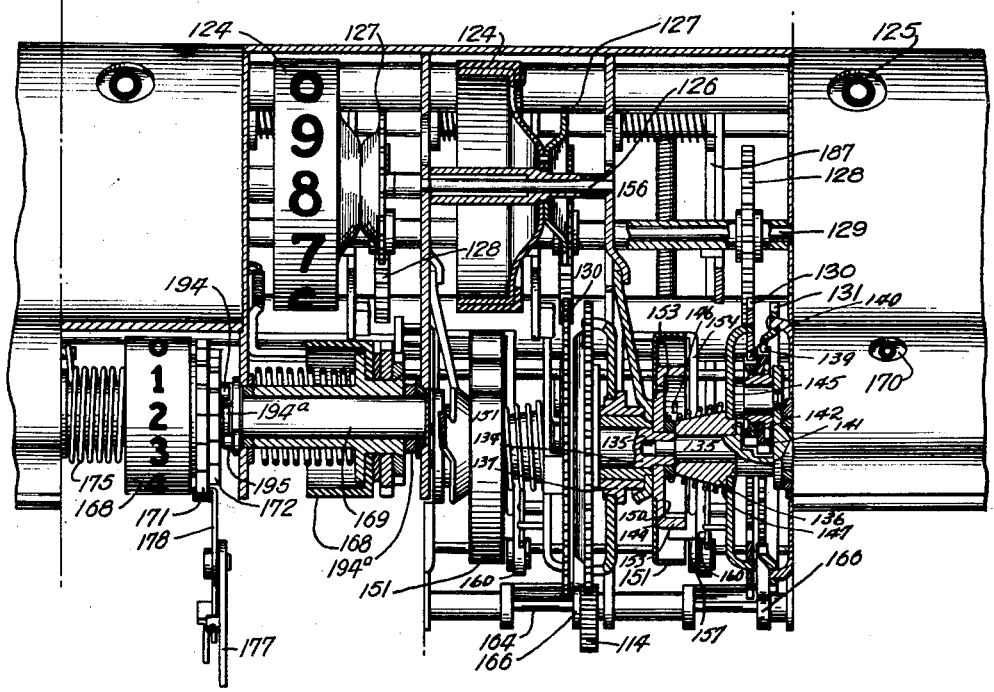
Fig. 5 is a composite sectional view taken transversely of the machine and showing the accumulator mechanism, the counter mechanism and various other parts.

As the present invention may be used with various types of calculating machines, and as the general construction and operation of the present machine may be readily understood by reference to my copending parent application Ser. No. 654,874, a brief description of the general features of this machine will be sufficient for an understanding of the present invention. The same reference numerals used in said application will be used herein to designate the same parts. Figs. 1 to 7 are identical copies of Figs. 2, 3, 6, 7, 11, 12 and 13 respectively, of said application.

The various instrumentalities, which constitute the actuating mechanism from which calculative motion is transmitted to the accumulator mechanism, are supported by a frame mounted on the base 21 of an enclosing casing, said frame essentially consisting of side skeleton plates 22 and intermediate skeleton plates 23 disposed between the various actuating mechanisms of the several orders of the machine, and all tied together at suitable points by transverse tie rods 24. The various orders of the actuating mechanism are stationary, i. e., there is no shift from order to order of the actuating mechanism. In performing multiple-stroke key-set power-driven calculation, shifting is effected by the carriage which supports the accumulator mechanism, as hereinafter described.

According to the present type of machine, a number of columns of nine keys each are provided, a column for each order of the machine. Each column of keys 25 corresponds with the column actuator and attendant parts and constitutes a mechanism either for driving the column actuator an amount proportionate to the digital value of the particular key operated or for setting and controlling the column actuator to be otherwise driven a like amount. The keys of each column are numbered from "1" to "9" and complementaly for negative calculation from "0" to "8" in front to rear order of the machine; the key at the extreme front is adapted to effect or otherwise to control operation of the column actuator through an arc substantially one-ninth of that produced by the operation of the key at the extreme rear of the machine, and upon depression of intermediately positioned keys, the column actuator is or may be moved through various arcs respectively determined by the digital value of the intermediate keys depressed.

Each key 25 is provided with a stem 26 extending down and bearing upon the corresponding column actuator 27 for the key-driven actuation of the machine. Spring mechanisms 28 similar to those employed in the well-known "Comptometer" are utilized for the purpose of restoring the respective keys 25 to normal independently of the column actuator.

There is a column actuator 27 for each column of nine keys of the machine, and each column actuator is preferably constructed in the form of a bell-crank lever having a long horizontal arm 29, a relatively short depending vertical arm 30, and being pivoted at the junction point of said arms to the framework at the rear of the machine, as shown at 31. The horizontal arm 29 of the column actuator extends forwardly from rear to front of the machine and receives the key-impulse to actuate the accumulator, when the machine is set for key-driven actuation. Pivoted at 32 on a fixed shaft extending through and supported by the framework of the machine is an actuator sector 33 for transmitting the calculative motion of the column actuator to the accumulator. The pivoted sector 33 is provided with a set of gear teeth 34 on its arcuate periphery and said teeth are adapted to mesh with ordinal gears 111 forming part of the ratchet mechanisms. Motion produced by the normal movement of the column actuator is transmitted to the pivoted sector 33 by an abutment 35 at the end of a double-arm lever 35a pivoted on the hub of the sector 33 concentrically with shaft 32 and connected with the column actuator by a link 35b. The abutment 35 is normally held in engagement with the rear radial edge 36 of the sector by a spring 37 connecting the forward radial arm 38 of said sector with said abutment 35. So long as any key 25 is depressed only that amount necessary to effect a movement of the sector 33 corresponding with the digital value of the key, the spring 37, during the downward movement of the column actuator arm 29, will hold the sector 33 against the abutment 35. If, however, the key be depressed beyond such normal movement the sector 33 will be arrested, and will be prevented from moving more than the amount of the digital value of the particular key depressed, by the engagement of the respective digital stop 109, of the stop bar 105 that is connected with said sector, with the particular key depressed but the spring 37 will permit the abutment 35 to move, with a yielding action, away from the sector 33 as the column actuator arm 29 continues to move downwardly.

In key-driven actuation, the column actuators are restored to normal position, i. e., the horizontal arms 29 are lifted, respectively by the key-driven functioning member of the corresponding dual flexible link mechanism.

The universal actuator 39 functions as an abutment for causing the spring-tensioning that effects the return movement of the column actuators in key-driven actuation. It comprises a power-driven oscillatory shaft 40 extending transversely of the main frame. Fixed to said shaft 40 so as to partake of its oscillatory movement are the universal actuator plate members 41 which correspond ordinally with the column actuators 27. It is particularly these plate members 41 which constitute the abutments for the spring tensioning hereinafter referred to.

The dual flexible link mechanism of each column actuator and corresponding universal actuator plate comprises an upper link mechanism 42 and a lower link mechanism 43.

In key-driven operation, on depression of the numeral key 25, the horizontal column actuator arm 29 moves downwardly an amount proportional with the digital value of the key depressed. This movement of the column actuator turns the transmitting gear sector 33 in a counter-clockwise direction (see Fig. 3) the required amount for the incremental accumulative actuation which occurs on the reverse clockwise rotation of the sector 33. The downward movement of the horizontal column actuator arm 29 causes a rearward movement of the depending column actuator arm 30 and this rearward movement of said arm 30 stretches or tensions the spring 44 to produce power for the return movement of the column actuator, inasmuch as the ram 46 remains stationary. In this manner, the spring 44 of the flexible link mechanism functions as the return spring for the column actuator in key-driven actuation.

In all forms of calculative actuation, it is the upward return movement of the transmitting gear or adding sectors 33 that effects the actual transfer of incremental ordinal accumulation to the accumulator mechanism, namely, the adding actuation. This is effected by an ordinal internal ratchet mechanism, operating in like manner to that shown and described in the Comptometer patents hereinbefore mentioned in my parent application.

The operation of the actuating mechanism of the machine, when performing key-set power-driven, in the present instance crank-driven, calculation is illustrated in Fig. 4. In such key-set power-driven actuation, the depression of any ordinal numeral key merely releases or unlocks the column actuator corresponding to its order for subsequent calculative movement by the power mechanism, the operation of a numeral key being a mere unlocking of an ordinal locking device corresponding to the order in which the key is depressed, as contra-distinguished from an actual calculative movement produced by key operation in key-driven actuation of the machine. When the machine is set to operate in key-set power-driven actuation, the column actuators in all orders of the machine are locked against movement by an ordinal locking mechanism and only those column actuators are operated which have been released by a setting of one of the corresponding ordinal keys. The oscillatory movement of the universal actuator plates 41 is employed first to depress and then elevate those column actuators which have been released from the ordinal locking mechanism by previous numeral key setting.

Such oscillatory movements of the universal actuator is effected by a crank mechanism comprising the crank 56 and connections (not shown herein) with the left hand end of the universal actuator shaft 40. The connections for the universal actuator train are so proportioned relatively to each other that each single rotation of the crank 56, in either direction, will impart first a clockwise and next a counter-clockwise movement to the universal actuator shaft 40 and the series of ordinal actuator plates 41. In other words, each single rotation of the crank 56 is accompanied by a downward and upward oscillation of the universal actuator plates. In key-set actuation, each single oscillation of said plates 41 effects a single incremental accumulative movement of the selected column actuators.

Selective operation of the machine is controlled by the keys 83, and 88, the key 83 setting the machine for the key-driven operation and the key 88 for power-driven operation. After the keys 25 of the various selected orders have been "set" in key-set operation, the universal actuator mechanism may be operated either for a single actuation, as in additive calculation, or for as many repeated actuations as desired, when performing multiple stroke calculation.

Pivotally mounted at 104 on the forward arm 38 of the adding sector of each column actuator is a digital stop bar 105 which extends to the front of the machine and has its front end pivoted at 106 to the top of a rocker arm 107, the latter being pivoted on a cross-rod 108. The said bar 105 is provided with a series of eight stops or projections 109 respectively corresponding to the column of digital or numeral keys of its corresponding order, with the exception of the nine key and adapted to arrest the rearward movement of said bar 105 by the depression or setting of a key 25, (see Figs. 1, 3 and 4). The nine key and the movement of the sector 33 corresponding thereto represents the extreme movement of said sector, and such movement is preferably arrested by a fixed stop 109a attached to the framework, although, if desired, a further stop 109 for the nine key could be provided on the stop bar. The stops or projections 109 are located at different distances in front of the keys with which they respectively co-operate, the stop 109 corresponding to the "1" key being the nearest to said key and the stop corresponding to the "9" key being the farthest away. When a key 25 is actuated in key-driven actuation or set for power-driven actuation, the adding sector 33 of the corresponding column may move downwardly until the bar 105 has shifted the corresponding stop into engagement with the key depressed, whereupon the movement of the sector 33 is arrested.

The motion of the adding sectors 33 of the column actuators is transmitted to the accumulator mechanism by ordinal internal ratchet mechanisms, which operate on the same principle as the internal ratchet mechanisms of the standard "Comptometer" type exemplified in the prior patents hereinbefore mentioned in my parent application, for permitting the numeral wheel and transmitting gearing of the accumulator mechanism to remain idle during the rearward downstroke of the corresponding adding sector 33, but to be actuated to effect the accumulation during the return stroke of said sector. These ordinal ratchet mechanisms are mounted on a supporting rod or shaft 110 that extends transversely through the stationary framework of the machine. Each ratchet mechanism includes a gear 111 in mesh with the rack teeth of the corresponding ordinal sector 33, a hollow member providing internal teeth forming an internal ratchet element 112 fixed to said gear 111 for rotation in one direction relative to a lantern wheel 113, a gear 114 fixed to said lantern wheel and adapted to mesh with an order of the accumulator mechanism, (see Figs. 6 and 7) and the usual internal pawl (not shown) inside the hollow member forming the internal ratchet element 112, interposed between the internal teeth of the ratchet on the inside of the element 112 and the lantern wheel 113 and fixed to the latter to rotate therewith for clutching the lantern wheel and gear 114 to the ratchet 112 only during the return up-stroke of the corresponding adding sector. Co-operating with the lantern wheel are the usual stop devices for preventing erroneous operation, said devices including the spring actuated back-stop pawl 115, and the spring actuated over-throw-prevention pawl 116.

In accordance with the invention, the accumulator mechanism is optionally stationary with respect to the several orders of the actuating mechanism for key-driven actuation, or for key-set power-driven additive actuation, or shiftable for key-set power-driven multiple stroke actuation, or, if desired, for key-driven multiple stroke actuation. The accumulator mechanism includes the numeral wheels, and the interposed transmission gearing mechanism which receives direct incremental actuation from the column actuators and transfers it to the numeral wheels of the corresponding orders and also receives or transmits indirect actuation from a lower order gearing to a higher order gearing for effecting carrying of the tens from order to order, whenever a numeral wheel of a lower order passes the "9" point, whether in gear with the actuating mechanism or not. The carriage comprises a supporting framework including skeleton plates 117 interposed between the various orders of the accumulator and tied together by transverse tie rods 118, and a top inclosing casing 119. The carriage is both pivotally and slidably mounted on a rod 120 supported from the top of the fixed casing of the machine and is preferably constructed of a width somewhat greater than the width of the stationary casing to support a number of accumulator orders in excess of the orders of the actuating mechanism. This construction provides a machine of large capacity for multiple stroke calculation, whether positive as in multiplication or negative as in division. In the machine illustrated in the drawings there are eight columns of the actuating mechanism and seventeen columns or orders of the accumulator mechanism. Mounted on the stationary frame of the machine is a bed plate 121 provided with a series of notches or grooves 122, said grooves marking the various ordinal positions of the carriage when at rest and being adapted to co-operate with a depending lock arm 123 supported by the carriage which enters one of the grooves when the carriage has been lowered into proper registering position and the carriage is held from shifting. For a more complete description and illustration of the means for maintaining the lowered carriage in proper registering position with respect to the orders of the adding mechanism reference is hereby made to my copending application Ser. No. 107,527 filed May 7, 1926 for calculating machine. The numeral wheels 124 for registering accumulation are each provided with the usual nine digits and with the zero mark, which may be viewed through sight openings 125 in the cover plate of the carriage. The numeral wheels of the respective orders of the accumulator mechanism are mounted to rotate on a cross-rod or fixed supporting shaft 126 supported by the framework of the carriage and each numeral wheel is provided with its operating gear 127 in mesh with a gear 128 mounted on a parallel cross-rod 129. Direct actuation by the actuator for the order or indirect actuation, as by a carry from the next lower order, is transmitted by the transmission gear mechanism of the accumulator to the gear 128 and the latter in turn transmits the accumulative motion to the gear 127 for rotating the numeral wheel in accordance with the incremental movement of either a direct actuation by the actuator mechanism or an indirect actuation by the carry mechanism for the next lower order, or the incremental movement of both a direct and indirect actuation when both occur concurrently.

The transmitting gear mechanism of the accumulator receives the actuation of the column actuators from the gears 114 of the internal ratchet mechanisms and transfers such actuation to the numeral wheels of the corresponding orders. It also embodies a carrying mechanism that employs the same gear transmission for effecting a carrying of the tens from lower orders to higher orders, whenever the numeral wheels of lower orders pass the "9" point. The carrying movement in the higher order may take place, in accordance with the mechanism of the invention, concurrently with a direct actuation of said higher order by its own corresponding column actuator without in any manner swallowing up the carrying impulse or entailing loss of carry. The accumulator mechanism of each order supported by the carriage comprises a pair of juxtapositioned combined internal and external gears 130 and 131, the external gear teeth 132 of gear 130 being in mesh with the gear 128 and the external teeth 133 of the right-hand gear 131 being in mesh with the gear 114 of the internal ratchet mechanism 112 before described. The gear 131 is loosely journaled upon a stub shaft 134 supported by a skeleton plate of the carriage frame and the left-hand gear 130 is loosely journaled upon a short stub shaft 135 which passes through the hub 136 of gear 130, the hub 137 of gear 131, and is itself mounted for rotary movement in a socket 138 formed in the stationary stub shaft 134. The external teeth of gear 131 are differential with respect to the external teeth of gear 130, for example gear 131 may have thirty-six external teeth while gear 130 has forty external teeth. The internal teeth 139 of gear 131 are also differential with respect to the internal teeth 140 of gear 130, for example, gear 131 may have forty-four internal teeth 139 and gear 130 may have forty internal teeth 140. The short stub shaft 135 is concentric with the axis of rotation of the gears 130 and 131 and itself constitutes a carrier for a pair of differential epicyclic pinions 141 and 142, pinion 141 corresponding to gear 131 and meshing with its internal teeth 139 and pinion 142 corresponding with gear 130 and meshing with its internal teeth 140. The pair of differential pinions 141, 142, are fixed together and rotate about a common axis 143 that is eccentric to the axis of rotation 135 of gears 130 and 131. For example, pinion 141 may have twenty-two teeth and pinion 142 eighteen. Said pinions are journaled on the outer end of a carrier arm 144 fixedly supported by and projecting from shaft 135 in a direction transverse to its axis of rotation. The pair of differential epicyclic pinions 141, 142, constitute the interposed transmitting gearing for transmitting direct actuation from the gear 114 of the internal ratchet mechanism to the numeral wheel gear 127 of the corresponding order. The transmission of direct incremental actuation may take place while the epicyclic pinions are moving only about their axis 143 and no epicyclic movement of said pinions about the axis 135 is taking place. In fact, this is the mode of operation except when a carry is being transferred from a lower order, but the carrying transfer which involves an epicyclic movement of the pair of pinions does not disturb the work of the pinions in transmitting direct actuation by rotation on axis 143. The transmission of direct actuation is as follows: On the up-stroke of the column actuator arm the internal ratchet mechanism gear 114 is rotated for a distance sufficient to move the numeral wheel the number of numeral spaces required by the key actuated or set. The movement of gear 114 is transmitted to external gear 133 which in turn rotates internal gear 139, internal gear 139 rotates the pair of differential pinions 141, 142, pinion 141 meshing with gear 139 and pinion 142 meshing with gear 140 to rotate the latter. The rotation of gear 140 also rotates external gear 130, thereby rotating gear 128 and the numeral wheel gear 127. The gearing just described is so proportioned that external gear 132 turns a half rotation during each complete rotation of the corresponding numeral wheel gear 127 and numeral wheel 124.

The epicyclic movement of the pair of differential pinions 141, 142, is employed to receive and impart to the combined internal and external gear 130 a further one-step movement when a carry is released by the next lower order of the machine, that is when the numeral wheel of the next lower order passes between the "9" point and zero. The left-handed face of each combined internal and external gear 130 is provided with gear arms 145 to a projecting stud 146 of which is secured one end of the carrying spring 147 which embraces the hub 136 of the gear 130. The other end of the carrying spring 147 is secured to a stud 148 projecting from a spider 149 mounted on the right-hand end of and rigidly secured to the stub shaft 135 of the pair of differential pinions of the next higher order. The spider 149 supports a disk 150 having a flanged periphery 151 provided with a pair of diametrically opposite inward projections 152, the purpose of which will appear hereinafter. The disk 150 constituents an escapement wheel for the carrying transfer in the next higher order, whenever a carry is to go over from a lower order. Projecting diametrically oppositely from the spider 149 of the escapement wheel 150 is a pair of carry-storage stop-lugs 153, of which first one and then the other is adapted to retain the escapement wheel 150 against rotation and the differential pinions 141, 142, of the higher order against epicyclic movement, by the co-operation of a carry-storage-retaining latch 154. The storage retaining latch 154 of each order of the machine is mounted on a transverse rod 155 supported by the framework of the carriage and is provided with an actuating spring 156 for moving the latching detent 157 into engagement with a lug 153 of the escapement wheel 150. A depending arm 158 which is adapted to engage a transverse rod 159 limits the pull of the spring 156 on the latch 154. Projecting from the free end of said latch 154 is a dolly roll 160 which is depressed to lower the free end of the latch 154 and to move the detent 157 to release the escapement wheel 150, whenever a carry is to go over from the lower to the higher order. This occurs at each one-half revolution of the lower order gear 130, at the time when the numeral wheel of said lower order is passing between the "9" point and zero. Projecting from the arms 145 of said gear 130 is a pair of carry release cams 161 positioned diametrically oppositely with respect to the gear and being one or the other adapted to engage and depress the dolly roll 160 of the latch 154 of the higher order at the moment of carry release. During direct actuation by its own column actuator the combined internal and external gear 130 of each lower order of the machine acts as a carrying spring winding gear for the purpose of winding the carrying spring 147 to impart a carry-producing impulse to the escapement wheel 150 of the higher order. The carrying spring 147 is wound during each one-half revolution of the gear 130 between the points of carrying release by the cams 161. At the moment of carry release the carrying spring 147 has power stored in it sufficiently to turn the escapement wheel 150 of the higher order, to which said carrying spring is also attached, and this effects an epicyclic movement of the pair of differential pinions 141, 142, of said higher order, by reason of the turning of the carrier 144 through the rigid connection of spider 149 with the shaft 135 for the next higher order. By such epicyclic movement of the pinions 141, 142, in the next higher order, because of the differential number of teeth in the pinions themselves and in the combined internal and external gears with which said pinions mesh and co-operate, the gear 130 of the higher order is imparted a movement sufficient to actuate the numeral wheel of said higher order one extra numeral space required by the carrying transfer. When released by cam 161, the retaining latch is restored to normal position by its spring 156 to engage the carry-storage retaining lug 153 opposite to the one just released, until the next carrying transfer operation. Until said latch 154 has moved back to its normal position, the escapement wheel 150 is prevented from completing its full half-rotation by one of the inward projections 152, which engages the detent 157 of the latch, should the latch be in any position other than normal, by any delayed key action that would hold cam 161 in contact with the dolly roll of the latch, and shifts by a camming action the detent of said latch into normal position in engagement with the lug 153.

In key-driven actuation, or in key-set power-driven additive actuation, whether positive or negative, the carriage containing the accumulator mechanism is stationary relatively to the actuating mechanism throughout the performance of the entire example, preferably with the first order of the accumulator mechanism in operative engagement with the first order of the actuating mechanism. In multiple place key-set power-driven calculation, or if desired in key-driven multiple place calculation it is or may be necessary, however, to shift the carriage from order to order of the machine in order to effect the accumulation of the multiple strokes represented by each digit of one factor. For example, in performing multiplication, a multiple place factor, such as the multiplicand, would be set up by the keys 25. If the multiplier is also multiple place, the carriage may be set, first, with the units order of the carriage corresponding with the units order of the actuating mechanism, and the crank 56 would be turned for a number of revolutions corresponding to the digital value of the units place of the multiplier. After this is accomplished, the carriage is shifted and the crank then turned for a number of revolutions corresponding with the tens place of the multiplier, and so on until each ordinal digit of the multiplier is exhausted. For shifting the carriage, there are provided at its opposite ends handles 162 so that the carriage may be first swung upwardly on its supporting rod 120 and then shifted transversely of the stationary casing of the machine, as required.

The operation of lifting the carriage disengages the gears 131 of the ordinal accumulator mechanism from the gears 114 of the ordinal actuating mechanism, and this would, unless prevented, release the ends of the carrying springs 147 which are attached to the gears 130. In order to prevent the carrying springs from unwinding reversely and losing their tension, there is provided in each order of the accumulator mechanism a locking lever 163 (see Fig. 6) for locking the gears 130 against movement to release the carrying springs, whenever the respective gear trains are disengaged from the actuating mechanism. The locks 163 are pivoted at their lower ends at 164 to the several skeleton plates of the carriage frame and the upper ends of said lock levers are provided with detents 165 adapted to move into engagement with the external teeth of the gears 131, when the locks 163 are released by the lifting of the carriage. The said lock levers 163 are provided with horizontal arms 166 which engage a ledge of the bar 121 to throw the detents out of engagement with such gears as are to be engaged with the actuating mechanisms, when the carriage frame is in its lowered lowest position. When, however, the carriage is lifted spring 167 connecting the vertical arms of the lever 163 with the rod 155 are released to pull the detents 165 of said levers forwardly into locking engagement with the gears 131. As the gears 130 are not locked, even in those orders of the accumulator in which locks 163 have not been released by engagement with bar 121, the carrying transfers may nevertheless take place although such orders may not be in operative position with respect to any part of the actuating mechanism.

Figure 6:
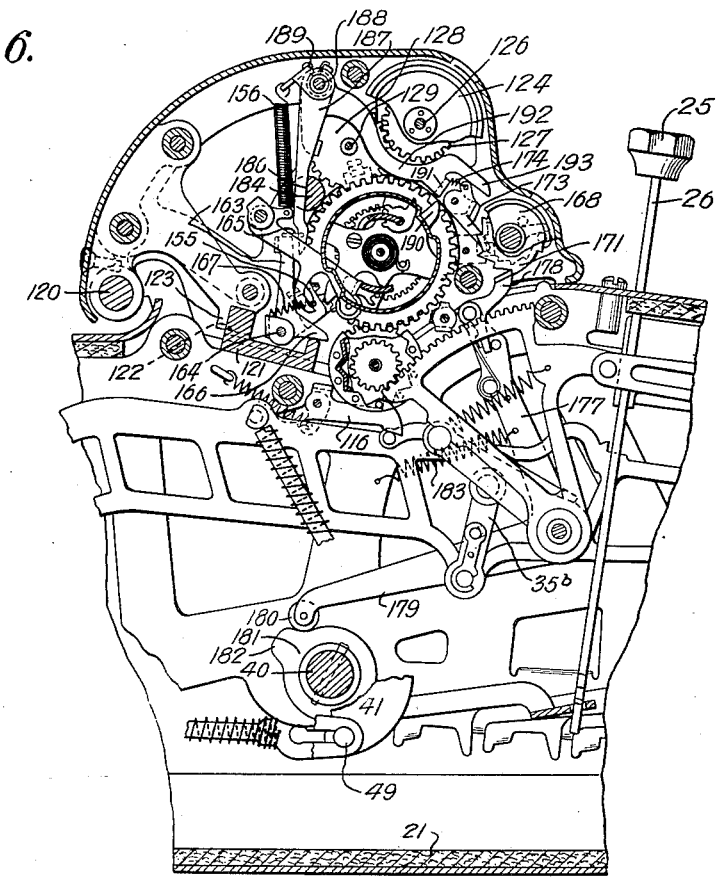
Fig. 6 is an enlarged longitudinal sectional view through the rear of the machine.
Figure 7:
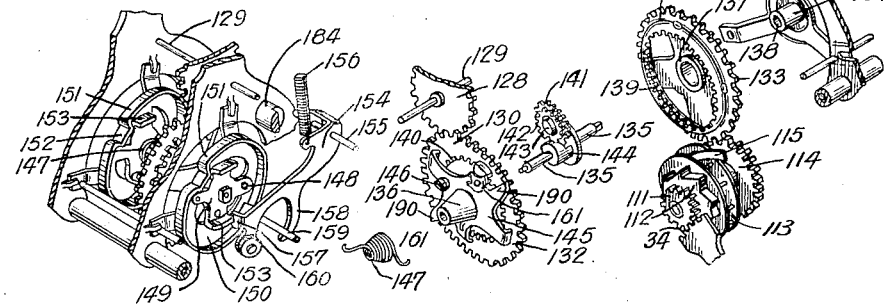
Fig. 7 is a perspective view of the automatic carrying and transmitting mechanism for transmitting both direct and indirect actuation, the parts being shown in both assembled and disassembled relation.

Zeroizing mechanism is provided for restoring to zero the several orders of the accumulator mechanism. A zeroizing shaft 184 extends transversely through the framework of the carriage and is provided at its right-hand end with a zeroizing handle 185 (see Fig. 2) by which the shaft may be swung back and forth. The handle 185 extends beneath the cover of the carriage and in zeroizing may be pulled forwardly toward the carriage shift handle, as indicated by the dot-and-dash line in Fig. 3. The zeroizing shaft 184 is provided with ordinal notches 186 within which seat the depending zeroizing release lever 187 corresponding to the several orders of the accumulator mechanism. These levers are pivoted at their upper ends on a rod 188 supported by the skeleton framework of the carriage and are retained in their normal positions by the springs 156 connected with the latches 154. The lower ends of said zeroizing release levers project into the path of movement of the lock levers 163, and when said release levers 187 are moved rearwardly toward the left, as viewed in Fig. 6, their motion is transmitted to the lock levers 163 to push the locking detents away from engagement with the gears 131 of the accumulator trains and to release the carrying springs 147. This motion occurs whenever the carriage has been lifted and the zeroizing lever 185 concurrently pulled forwardly to turn the shaft 186 so that the levers 188 are forced rearwardly by the engagement of the edges of the recesses in said shaft. Inasmuch as the gears 130 are released by disengagement from the gears 114 the carrying springs 147 are free to turn gears 130 and with them through the other transmitting gearing all the numeral wheels backwardly to the zero point. When the numeral wheels of the accumulator mechanism have arrived at zero the reverse rotation imparted by the released carrying springs 147 is arrested to retain the numeral wheels in zero positions by means of zero stops 190 provided at diametrically opposite positions on the respective gears 130 (Figs. 6 and 7). One or the other of these stops 190 is engaged by a stop detent 191 mounted at the end of the zeroizing stop lever 192, whenever the gear 130 has been turned so that its corresponding numeral wheel 124 is at zero. The zeroizing stop levers are pivoted at their upper ends on the shaft 188 and are connected by springs 189 with the release levers 163 to form flexible bell-cranks. The lower ends of the stop levers are moved downwardly to position the stop detents 191 in the path of the stops 190, whenever the zeroizing shaft 184 is turned. A spring fastened to a hook formed by hollow milling of the shaft, winds around the shaft 184 when turned in a zeroizing operation and restores the shaft and its operating handle 185 to normal as shown in Fig. 16 of my aforesaid parent patent.

The invention as hereinabove set forth may be variously embodied within the scope of the claims hereinafter made.

I claim:

1. In a calculating machine, in combination: an actuating mechanism; a register mechanism; a pair of internal gears interposed between the registering mechanism and the actuating mechanism and geared therewith, said internal gears having a common axis and being disposed adjacent to each other; and a pair of epicyclic gears mounted for epicyclic movement relative to both internal gears the cyclic axis of which is common to that of said internal gears, said epicyclic gears meshing with the internal gears for transmitting direct calculative actuation about their own axis from the actuating mechanism to the registering mechanism and for also transmitting indirect actuation in the carrying of the tens from the lower orders to the higher order of said registering mechanism by their epicyclic movement relative to both of the internal gears.

2. In a calculating machine, in combination: ordinal register wheels, ordinal actuating devices for transmitting direct calculative actuation to said register wheels; carrying mechanism for transmitting indirect actuation from the lower orders to the higher orders of said registering wheels to effect carrying of the tens; and an epicyclic gear train corresponding to each order of the register wheels, said train consisting of two internal and two pinion gears mounted for epicyclic movement relative to both internal gears which act as a common transmitting device for both direct and indirect actuation.

3. In a calculating machine, in combination: ordinal actuating devices; ordinal register wheels receiving direct actuation from the ordinal actuating devices of their own orders and indirect actuation controlled from the lower orders; and ordinal differential epicyclic gear trains, each consisting of two internal and two pinion gears mounted for epicyclic movement relative to both internal gears which act as a common transmitting device for both direct and indirect actuation.

4. In a calculating machine comprising an adding mechanism including actuating devices and the accumulator mechanism consisting of registering wheels receiving direct actuation from the actuating devices to register the accumulative degrees of actuation, the improvement characterized by a spring motor mechanism for storing increments of power resulting from motion of the lower orders, combined with a gear train including a pair of internal gears and a pair of co-operating epicyclic gears mounted for epicyclic movement relative to both internal gears, said gear train transmitting actuation to the register wheel directly from the actuating devices of the corresponding order or from power stored by said spring motor mechanism.

5. An accumulative registering device, comprising: a pair of internal gears having a common axis and one of said gears having a greater number of teeth than the others; a pair of pinions meshing with the internal gears, the teeth of said pinions being differential to one another and said pinions being secured to one another so that they turn in common about the same axis; means for rolling said differential pinions in epicyclic movement on both of the internal gears simultaneously; means for holding one of the internal gears against rotation whereby the other is rotated by the epicyclic movement of said pinions and the differential; and means for locking said pinions against epicyclic movement to transmit rotation to one internal gear by the rotation of the other.

6. In a calculating machine including a registering mechanism and an actuating mechanism, the improvement characterized by a differential gear mechanism mounted for epicyclic carrying movement and interposed between said registering mechanism and said actuating mechanism, said differential gear mechanism including a pair of pinions and two internal gears having a differential in gear ratio for effecting differential motion upon epicyclic movement to transmit from the actuating mechanism to the registering mechanism indirect increments of calculative actuation.

7. In a calculating machine having an actuating mechanism and an accumulative registering device receiving both direct and indirect actuation from said actuating mechanism, the improvement characterized by a transmitting means interposed between said registering device and said actuating mechanism through which both direct and indirect actuation is transmitted for registering the increments of calculative accumulation, said transmitting means including a pair of differential epicyclic gears having a differential in gear ratio for transmitting the indirect actuation by the differential movement produced upon epicyclic movement.

8. In a calculating machine including an actuating mechanism, in combination: registering wheels; an epicyclic gear carrier; a pair of gears mounted on said carrier for epicyclic motion; transmitting gearing interposed between said registering wheels and the actuating mechanism for transmitting direct actuation to the register wheels, said transmitting gearing being also in mesh with said epicyclic gears for epicyclic movement of the epycyclic gears relative to the gears they connect in the transmitting gearing; and means for imparting motion to said gear carrier to transmit indirect actuation through the gearing from a lower order to a higher order register wheel to effect carrying of the tens.

9. In a carrying mechanism for an accumulative register, the improvement characterized by a pair of differential internal gears combined with a pair of differential epicyclic gears in mesh with said internal gears and constituting a differential gear mechanism having a differential in gear ratio for imparting motion to one of said internal gears through the differential in gear ratio upon epicyclic movement of the epicyclic gears in the transmission of power for the carrying of the tens.

10. In a carrying mechanism for calculating machines, the improvement characterized by a pair of differential epicyclic gears having a differential in gear ratio through which the carrying impulse is delivered and that through their epicyclic action effect a differential movement for producing the carry.

11. In a calculating machine, in combination: a register wheel, an actuating device; a combined internal and external gear in mesh with said actuating device; another combined internal and external gear in juxtaposition with the first-named gear and having a common axis of rotation therewith, the number of internal teeth of said second-named gear being differential in respect to the number of internal teeth of the first-named gear and the second-named gear being geared to the registering wheel; and a pair of epicyclic gears operating about the common axis of the two combined internal and external gears and meshing with the internal gear teeth of both to produce a differential motion between said gears when the epicyclic gears are rotated about the common axis of rotation of the first named and second-named gears.

12. In an adding mechanism including actuating devices and an accumulator mechanism receiving direct actuation from the actuating devices, the improvement characterized by a pair of differential epicyclic gears having a differential in gear ratio for transmitting by their differential during their epicyclic movement indirect actuation from order to order of the accumulator mechanism to effect carrying of the tens from a lower to a higher order.

13. In a calculating machine, an accumulator mechanism complete consisting of ordinal numeral wheels and their interordinal carrying devices and gears to receive actuation, mounted wholly within a shiftable carriage so as to be adjustable to receive actuations from different orders of adding mechanism, said inter-ordinal carrying devices comprising carrying power means individual to the respective orders and adapted for individually supplying the power in the individual orders for effecting the carrying impulse from the respective orders to the next order.

JOSEPH A. V. TURCK.